United States Patent
Del Bimbo et al.

(10) Patent No.: US 11,934,918 B2
(45) Date of Patent: Mar. 19, 2024

(54) LASER-BASED METHODS, DEVICES AND SYSTEMS FOR QUANTUM CLASSIFICATION AND OPERATION CONTROL

(71) Applicant: MULTIVERSE COMPUTING S.L., Donostia-San Sebastián (ES)

(72) Inventors: Gianni Del Bimbo, Donostia-San Sebastián (ES); Samuel Mugel, Toronto (CA); Román Orús, Donostia-San Sebastián (ES)

(73) Assignee: MULTIVERSE COMPUTING S.L., Donostia-San Sebastián (ES)

( * ) Notice: Subject to any disclaimer, the term of this patent is extended or adjusted under 35 U.S.C. 154(b) by 377 days.

(21) Appl. No.: 17/464,264

(22) Filed: Sep. 1, 2021

(65) Prior Publication Data

US 2023/0058527 A1   Feb. 23, 2023

(30) Foreign Application Priority Data

Aug. 23, 2021   (EP) .................................... 21382777

(51) Int. Cl.
| | |
|---|---|
| *G06N 10/00* | (2022.01) |
| *G06F 9/30* | (2018.01) |
| *G06F 9/54* | (2006.01) |
| *G06F 18/214* | (2023.01) |
| *G06F 18/24* | (2023.01) |

(52) U.S. Cl.
CPC ......... *G06N 10/00* (2019.01); *G06F 9/30036* (2013.01); *G06F 9/544* (2013.01); *G06F 18/214* (2023.01); *G06F 18/24* (2023.01)

(58) Field of Classification Search
CPC .... G06N 10/00; G06N 20/00; G06F 9/30036; G06F 9/544; G06F 18/214; G06F 18/24

USPC ........... 505/832, 848; 365/161; 331/3, 94.1; 326/7

See application file for complete search history.

(56) References Cited

U.S. PATENT DOCUMENTS

2020/0342345 A1   10/2020   Farhi et al.

FOREIGN PATENT DOCUMENTS

| | | | |
|---|---|---|---|
| EP | 3664099 A1 | 6/2020 | |
| WO | WO-2019014589 A1 * | 1/2019 | ............. B82Y 40/00 |

OTHER PUBLICATIONS

Efficient networks for quantum factoring David Beckman *, Amalavoyal N. Chari (Year: 1996).*

(Continued)

*Primary Examiner* — Arnold M Kinkead
(74) *Attorney, Agent, or Firm* — CANTOR COLBURN LLP (57) ABSTRACT

A method for quantum classification and operation control includes radiating a vacuum chamber having an ensemble of neutral atoms with laser so as to trap atoms and form a quantum register. The method further includes the step of configuring a laser controlling function with M unitary operations based on a cost function for classification problems and a training dataset about a monitored target, radiating the ensemble of atoms accordingly, reading the quantum register, and setting a quantum classifier if the cost function with the values of the quantum register meet a condition, keep changing the laser controlling function and radiating the ensemble of atoms otherwise until a convergence condition is met, at which point the quantum classifier is set.

20 Claims, 2 Drawing Sheets

(56) References Cited

OTHER PUBLICATIONS

Basic circuit compilation techniques for an ion-trap quantum machine Dmitri Maslov1,2 1 National Science Foundation, Arlington, VA, USA (Year: 2017).*
European Search Report for European Application No. 21382777.7, dated Feb. 18, 2022, 14 pages.
Henriet et al., "Quantum Computing with Neutral Atoms", arxiv. org, Cornell University Library, Jun. 23, 2020, 41 pages.

* cited by examiner

LASER-BASED METHODS, DEVICES AND SYSTEMS FOR QUANTUM CLASSIFICATION AND OPERATION CONTROL

CROSS-REFERENCE TO RELATED APPLICATIONS

This application is related to and claims the benefit of European Patent Application No. EP21382777.7, filed on Aug. 23, 2021, the contents of which are herein incorporated by reference in their entirety.

TECHNICAL FIELD

The present disclosure relates to quantum computing. More specifically, it relates to methods, devices and systems that use a quantum circuit for classification of datasets for optimization of apparatuses and/or processes, and/or for detection of anomalies in the apparatuses and/or processes.

BACKGROUND

The operation or behavior of many processes, apparatuses or systems are representable by way of equations with multiple terms and variables so as to account for the different features in the respective process, apparatus or system. Oftentimes it is possible to improve the efficiency of the processes, apparatuses or systems by setting a superior configuration or modifying an existing configuration by a superior one that influences the concerned operation or dynamics.

Even when the processes, apparatuses or system under supervision are not very complex, the equations associated therewith representing their operation or behavior might include tens or hundreds of variables that are interrelated in some way, hence optimization of the equations requires large processing power.

Delay in the solving of such problems severely impacts the control of processes, apparatuses and systems of different industries, and more particularly the product resulting from the processes, apparatuses and system. It has been seen that quantum computing can shorten the time it takes to solve computational problems, for example EP-3664099-A1 describes the use of a quantum computing resource to solve an exchange problem.

In occasions the problems to be solved require the classification of data in several classes. this type of problems. Processes, devices and/or systems relying on an effective quantum classification might make possible to supervise and/or control different processes, apparatuses and systems in a fast and reliable manner.

SUMMARY

A first aspect of the disclosure relates to a method comprising:

radiating a vacuum chamber comprising an ensemble of neutral atoms, for example in the form of atomic vapor, with laser so as to trap atoms of the ensemble of neutral atoms in an array of optical tweezers, thereby providing a quantum register, and each optical tweezer comprising a single neutral atom;

digitally configuring, by processing a training dataset with a plurality of vectors about a target or monitored target where each vector has a historical value for each of N features of the target, a laser controlling function, and digitally reducing, based on the laser controlling function, a cost function counting an error in the classification of one or more vectors about the target where each vector has a value for each of N features of the target, where:

the laser controlling function includes M unitary operations, M being a natural number greater than 1 and less than or equal to N, with each unitary operation being at least dependent upon: a) the N historical values of each vector of the plurality of vectors of the training dataset, b) a set of weight values for a) and comprising a predetermined set of weight values, and c) a set of free parameters comprising a predetermined set of free parameters, and the cost function being reduced by changing the set of weight values of b) and the set of free parameters of c) of each unitary operation;

radiating the ensemble of atoms with laser so as to excite at least some atoms of the quantum register, with the laser being operated in accordance with laser parameters resulting from each unitary operation of the configured laser controlling function;

reading the quantum register with optical means, and digitally defining a bit for each atom in the quantum register with a binary value thereof based on an amount of light produced by the respective atom;

using the bits defined, digitally computing a result of the cost function counting the error in the classification of one or more vectors about the target where each vector has a value for each of N features of the target;

digitally processing a computed result of the cost function such that: when the result is below a predetermined threshold, digitally setting a classifier for the target, the classifier being set with the values of both the sets of weight values of b) and the sets of free parameters of c) of the configured laser controlling function; and when the result is not below the predetermined threshold, carrying out the following in a looped manner until a convergence factor fulfills a predetermined criterion:

digitally storing at least the result of the cost function as last computed;

digitally modifying the sets of weight values of b) and/or the set of free parameters of c) of each unitary operation with an optimization technique known in the art like e.g. gradient descent;

digitally reconfiguring the laser controlling function by processing the training dataset, and digitally reducing, based on the reconfigured laser controlling function, the cost function with the modified sets of weight values of b) and/or the set of free parameters of c) of each unitary operation;

radiating the ensemble of atoms with laser so as to excite at least some atoms of the quantum register, with the laser being operated in accordance with laser parameters resulting from each unitary operation of the laser controlling function as last reconfigured;

reading the quantum register with optical means after the last irradiation of the ensemble of atoms, and digitally defining the bits based on the quantum register as last read;

using the bits as last defined, digitally computing a result of the cost function;

digitally processing the result of the cost function as last computed, and digitally providing a convergence factor based on both said result and the result as last stored; and if the convergence factor fulfills the predetermined criterion, digitally setting the classifier for the monitored target, the classifier being set with the values of both the sets of weight values of b) and the sets of free parameters of c) of the laser controlling function as last reconfigured.

The target (or monitored target) is preferably an operation of an apparatus or system, or a behavior of a process.

The method provides a quantum classifier by way of a laser-based quantum circuit. The quantum classifier set can be used for classification of data and also for solving computational problems by inputting the data or problem to the quantum circuit, reading the quantum register and processing the bits resulting from the readout of the quantum register.

A magneto-optical trap is set in the vacuum chamber by way of at least a first laser (it could be one laser or a plurality of lasers) trapping neutral atoms of the ensemble of atoms in optical tweezers, and the trapped atoms form the quantum register. The optical tweezers are arranged as a lattice that does not necessarily must have any particular shape. The quantum register initially has all the atoms in a neutral or reference state, i.e. |0>, when the ensemble of atoms is to be radiated with at least a second laser. Likewise, the atoms are also in neutral or reference state whenever the ensemble is to be radiated with at least the second laser in accordance with a reconfigured laser controlling function. The laser controlling function drives the laser radiation of the entire ensemble of atoms and, depending on the behavior of the atoms that is precisely at least dependent upon the laser controlling function, certain atoms of will get excited and some others not as explained later in the disclosure.

The atoms remain trapped in the optical tweezers while the at least first laser radiates the atoms accordingly as known in the art and, preferably, they remain trapped at least until the quantum register is read. Notwithstanding, in some embodiments, the at least first laser stops radiating the atoms after the ensemble of atoms has been radiated with the at least second laser (using the laser parameters resulting from the corresponding laser controlling function); in these embodiments, even if the atoms do not remain trapped in the optical tweezers, they remain substantially static, which makes reading the quantum register possible as well.

In order to set a quantum classifier that attains good classification, the laser controlling function is made dependent upon the target to be monitored or even controlled so that any data to be classified or problem to be solved uses a quantum classifier specifically tailored to the target itself; this is achieved by using the training dataset, which is preferably related to the target. The target can be an apparatus, system or process, particularly the operation or behavior thereof. As aforementioned, the training dataset relates to the target itself, accordingly it includes the plurality of vectors each with N historical values quantifying one of N different features of the target. That is to say, the training dataset has a certain length J, and each point j in J is an N-dimensional vector $\vec{x}_j$; each of the values in $\vec{x}_j$ is a historical value in the form of a real number that quantifies a feature among N features of the target. By historical value is meant a measurement or a manually-introduced value that has happened in the past or is ongoing but is readily available, i.e. it is a value reflecting the current instantaneous operation or behavior of the target.

When data is to be classified in the context of the present disclosure, each vector $\vec{x}_j$ is to be classified in one class among a plurality of classes. This means that if the classification of vector $\vec{x}_j$ is denoted $y_j$, then $y_j$ is e.g. +1 and −1, or 1 and 0, when there are only two classes, or is e.g. +1, 0, and −1, or 3, 2, 1 and 0, when there are three classes, or four classes. Different class labels can be used, and different numbers of classes are possible within the scope of the present disclosure.

The laser controlling function has M unitary operations that each can code up to three different features of the target among the N features. Accordingly, the number of unitary operations necessary will depend on N and how many features are coded in each unitary operation (one, two or three features), the latter being configurable but, preferably for simplicity, M is made as small as possible whilst codifying all features, i.e. M=ceil(N/3).

The M unitary operations are preferably defined such that the combination of the unitary operations that provide the laser controlling function controls dynamics of the ensemble of atoms by way of the following time-dependent atomic Hamiltonian:

$$H(t) = h\Omega(t)\sum_j \sigma_j^x - h\Delta(t)\sum_j n_j + \sum_{ij} \frac{C_6}{r_{ij}^6} n_i n_j;$$

In the above equation: h is Planck's constant divided by 2π, i.e. h=1,0545718×10⁻³⁴ m² kg/s; Ω is the Rabi frequency of the laser radiating the ensemble of atoms; Δ, which is greater than or equal to zero, is a detuning between the laser radiating the ensemble of atoms and atomic frequencies of the atoms in the vacuum chamber, particularly the difference between the energy of the excited state and the energy of the reference state as known in the art, i.e. not excited; $C_6$ is an interaction strength of Van der Waals long-range interactions between atoms; $r_{ij}$ is a physical distance between atoms i and j; σˣ=|0><1|+|1><0|, i.e. it is the Pauli-x operator; n=|1><1|, i.e. it is the excitation number operator. Further, |0> and |1> are respective electronic levels for quantum states of an atom and respectively correspond to an atomic ground state and a Rydberg state. The Rydberg state corresponds to an excited state with a large quantum number (for example, but without limitation, 50 or higher, e.g. 60 or even higher, etc.), and the atomic ground state corresponds to a state not excited with a large quantum number (for example, but without limitation below 60, below 50, etc.).

The laser radiating the ensemble of atoms may time-evolve globally the ensemble of atoms when laser controlling function has a unitary operation generated by the Hamiltonian H(t). The unitary operation may evolve a time T for the n atoms in the ensemble:

$$U(T) = \mathcal{T}\exp\left(-\frac{i}{h}\int_0^T H(t)dt\right)$$

In the above equation, $\mathcal{T}$ is the time-ordering operator.

Further, it can also be seen that when the Rabi frequency Ω and the detuning Δ do not change in time, the following n-qubit unitary operator is obtained:

$$U(\Omega,\Delta,T)=\exp(-iHT/h)$$

From the above two equations and the Hamiltonian, it can be seen that up to three controllable laser parameters can be obtained from each unitary operation: the Rabi frequency Ω, the detuning Δ, and a gate time T; the gate time T controls the parameters of the Hamiltonian in accordance with the time of application or execution, namely, the duration. This means that by changing the weight values and free parameters of each unitary operation, both of which are variational parameters with the weight values scaling the respective datapoints and the free parameters adding a constant (positive, negative or zero) to the respective weighted datapoints, the resulting laser parameters change as well. These laser parameters are the ones set in the at least second laser when radiating the ensemble of atoms to excite at least some atoms of the quantum register and which ultimately set the quantum classifier.

Preferably, the laser parameters of each unitary operation includes the three parameters: the Rabi frequency $\Omega$, the detuning $\Delta$, and the gate time T.

The scope of the present disclosure is not limited to laser controlling functions configured according to said Hamiltonian and other equations are possible as well without departing from the scope.

Following the radiation of the ensemble of atoms with the laser that excites the neutral atoms or not depending upon the laser radiation controlled by the laser controlling function, i.e. the laser parameters, the quantum register is read. The quantum register is readable with optical means, for example an optical device capable of taking a fluorescence image of the quantum register. In this sense, the quantum states of the atom, i.e. the quantum bits, are identifiable through the brightness of the atom: in the optical means, $|0\rangle$ appears bright whereas $|1\rangle$ appears dark.

The quantum bits as read define or are converted into digital bits according to their quantum states. The digital bits are then used for classification of data in accordance with the cost function.

Once the result of the cost function is computed using the obtained bits, the result thereof is used to digitally determine whether the potential quantum classifier provides a good classification for the target depending upon the predetermined threshold. If the result is indicative of an insufficiently good classification because the result exceeds the predetermined threshold (or the result does not exceed the predetermined threshold, depending on how the threshold is set, both ways of setting the predetermined threshold being possible within the scope of the present disclosure), the quantum register is reconfigured in a looped manner. To this end, the result of the cost function is stored so that it can be used as a baseline in subsequent reconfigurations of the quantum register and, optionally, data about how the laser was configured (either the sets of weight values and free parameters, or the laser parameters resulting from the unitary operations configured with those sets) may also be stored for revision in the future or to be used as predetermined weight values and/or predetermined free parameters. Then, the sets of weight values of and the sets of free parameters of each unitary operation of the laser controlling function as last configured are modified, and then the laser controlling function is modified accordingly and with the same strategy of the first configuration thereof to provide modified laser parameters.

Once the modified laser controlling function is obtained, the laser radiates the ensemble of atoms in accordance with the laser parameters resulting from the unitary operations of the most recent laser controlling function. The quantum bits of the quantum register are read to define the new values for the digital bits, and the cost function is evaluated again with the most recent values for the digital bits. This process is repeated until the convergence factor obtained at least from the most recent result of the cost function (using the digital bits) and the previous result of the cost function (using the digital bits) fulfills the predetermined criterion (e.g. the convergence factor is less than a predetermined value). The convergence factor can be defined in different ways, e.g. the difference between the two results, a cumulative difference between pairs of results, etc.

Whenever the quantum classifier has been set, the laser controlling function will depend upon the data to be classified or the computational problem to be solved since the unitary operations will be dependent thereupon (by way of the vector or vectors a) introduced therein), along with the sets of weight values of b) and the set of free parameters of c) as stored. From this laser controlling function, the corresponding laser parameters are obtained for radiating the ensemble of atoms, and the readout of the quantum register thereafter will be used for the classification or solving.

The quantum classifier is a many-atom unitary gate that uses the collectivity of all the atoms in the vacuum chamber, namely the classifier acts on all the quantum bits and not only on one quantum bit. This, in turn, makes the quantum classifier naturally robust and precise in the pinpointing of anomalies in datasets, also in highly-imbalanced datasets.

In some embodiments, the laser controlling function has the following formula: $\mathcal{U}=L(M)L(M-1)\ldots L(1)$, where L are the unitary operations; each unitary operation L has the following formula: $L(i)=U(\vec{\theta}_i^k+\vec{\omega}_i^k\circ\vec{x}^k)\ldots U(\vec{\theta}_i^1+\vec{\omega}_i^1\circ\vec{x}^1)$, where: $\vec{\theta}_i^k$ is a three-dimensional vector of k-th components of free parameters, i.e. the set of free parameters of c); $\vec{\omega}_i^k$ is a three-dimensional vector of k-th components of weights, i.e. the set of weight values of b); $\vec{x}^k$ is a three-dimensional vector of k-th components of the different vectors $\vec{x}_j$ of the dataset used (e.g. the training dataset), i.e. the values of a), with the index j of the point in the dataset being swept from 1 to the length of the dataset (e.g. J) so that all points are evaluated; $\circ$ is a component-wise vector product, i.e. the Hadamard; and U is the unitary operator. The unitary operator U corresponds to the n-qubit unitary operator $U(\Omega,\Delta,T)=\exp(-iHT/h)$ as explained above. Also, i is an index of the unitary operation; and k is an index of parameters, with $k=1\ldots\text{ceil}(N/3)$. This choice of maximum value of k allows all the historical data of vector z to be codified correctly in the unitary operations.

With the laser parameters including $\Omega$, $\Delta$, and T, the following relationship can be established: $\vec{\phi}_i^k\equiv\vec{\theta}_i^k+\vec{\omega}_i^k\circ\vec{x}^k$. The laser frequency, the detuning, and the gate time used in the laser controlling function $\mathcal{U}$ thus depend on a set of the variational parameters $\vec{\theta}_i^k$, $\vec{\omega}_i^k$, and data information $\vec{x}^k$. Accordingly, there are 6×M×N variational parameters for configuring the classifier.

In some embodiments, the method further comprises:

reconfiguring the laser controlling function by processing a computational problem in the form of a function for classification problems that is at least defined by one or more vectors, with each vector having a value for each of N features of the target, and making each unitary operation to at least depend upon: a) the N values of each vector of the one or more vectors, b) the set of weight values of the classifier digitally set, and c) the sets of free parameters of the classifier digitally set;

radiating the ensemble of atoms with laser so as to excite at least some atoms of the quantum register, with the laser being operated in accordance with laser parameters resulting from each unitary operation of the reconfigured laser controlling function;

reading the quantum register with optical means after the last irradiation of the ensemble of atoms, and digitally defining the bits based on the quantum register as last read; and digitally solving the computational problem using the bits as last defined.

With the quantum classifier set, any computational problem that can be defined in relation to the target can be passed onto the quantum classifier for solving, including but not limited to classification of data itself. By way of example, the computational problem can mathematically define sets of error tolerances and error measurements in a production line. Depending on the current error measurements, or on the evolution of the error measurements, the solution to the computational problem may be indicative of a potential detuning of particular tools or machines in the production line, or indicative of a potentially flawed raw material.

The computational problem may be provided by the target itself, by an operator via user input means (e.g. keyboard, touchscreen, buttons, voice, mouse, etc.), by a remote computing device communicatively coupled with a computing device or system managing the quantum classifier, etc.

In some embodiments, the method further comprises digitally determining at least one of the following based on a solution to the computational problem:

existence of a predetermined event or condition in the target:

whether a potential anomaly exists in the target; and a configuration of the apparatus or the system (of the target) intended to improve the operation and/or solve the potential anomaly thereof, or a configuration of any apparatus or system in the process (of the target) intended to improve the behavior and/or solve the potential anomaly thereof.

The quantum classifier enables the detection of a problem in the target and/or the generation of a corrective action to be taken by the target in a timeframe shorter than that of classical classifiers and with lower power consumption.

In some embodiments, the digitally determining step at least comprises digitally determining the configuration; and the method further comprises: digitally providing the configuration and digitally providing at least one command to reconfigure to the apparatus (of the target), the system (of the target), or the apparatus or the system intervening in the process (of the target).

The corrective action can be supplied to the target in the form of a new configuration. The at least one command is an instruction for the target (e.g. apparatus or system) to change its current operation according to the new configuration. The configuration may be one or several parameters of all the parameters that control operation of the target, or may be a complete configuration that changes all the parameters or behavior in the operation of the target.

In some embodiments, the computational problem relates to one of: detection of a potential illness in medical measurements (e.g. images, blood samples, etc.), decision-making of a central unit of an autonomous vehicle, control of an electric device or machine, control of a production line, control of a factory, detection of fraudulent bank and credit card transactions, and credit-scoring for insurance and loans.

By way of example, different features of medical images and blood samples can be stored in vector $\vec{x}$ so as to construct a training dataset, that allows us detect potential illnesses with the classifier set with the method disclose.

For an autonomous vehicle, a first device or system carrying out the method would be connected to a second device or system gathering data from the environment, e.g. one or more sensors, GPS, etc., and which would be used by the first device or system to determine whether e.g. the car slows down or not.

In other applications, the method disclosed is used to analyze data from electric devices, machines, production lines, factory, etc. so as to establish correct operation, malfunction, incorrect processing of raw materials or workpieces, flawed raw materials, etc. The training dataset includes, in these cases, data of e.g. different sensors of the devices and/or machines show operational behaviors in different situations. The classifier is then capable of determining what is the behavior based on data relative to the features of the target.

Another application that may rely on the method is analysis of data from credit card transactions to detect fraud. In such a case, a system would store the details of previous transactions in vector $\vec{x}$ and, with examples of fraudulent and non-fraudulent transactions construct a training dataset for the setting of the classifier, so that the classifier detects fraud afterwards on an inputted set of credit card transactions to be classified between legit and fraudulent credit card transactions.

In some embodiments, the one or more vectors defining the function of the computational problem are to be classified among two classes, thereby yielding a binary classification problem. In some other embodiments, the one or more vectors defining the function of the computational problem are to be classified among n classes, with n being equal to or greater than 3.

The quantum classifier is not limited to binary classifications.

In some embodiments, the method further comprises, prior to the digitally configuring step, digitally randomly setting the predetermined sets of weight values of b).

In some embodiments, the method further comprises, prior to the digitally configuring step, digitally randomly setting the predetermined sets of free parameters of c).

The initial configuration of the laser controlling function may rely on randomly set weight values and free parameters so as to avoid reaching local minima in the reduction of cost functions, something that might occur when sets of weight values and sets of free parameters that e.g. have been found in the past as attaining good results are used as a predetermined sets. The sets of free parameters may likewise be initialized to zeroes in some embodiments.

In some embodiments, the cost function has the following formula: $C=\Sigma_j(y_j-F(\vec{x}_j))^2$; where: $F(\vec{x}_j)$ is an outcome of the classification of vector $\vec{x}_j$; and $y_j$ is a correct classification of vector That is to say, the cost function is the quadratic error in the classification of inputted vectors.

In some embodiments, the method further comprises, prior to radiating the vacuum chamber step, arranging a quantum circuit comprising: the vacuum chamber, at least two lasers, and the optical means.

A second aspect of the disclosure relates to a data processing device—or data processing system—comprising means for carrying out the digital steps or all the steps of a method according to the first aspect of the disclosure.

In some embodiments, the device or system further comprises the target or monitored target.

A third aspect of the disclosure relates to a controlling device or system comprising: a vacuum chamber, at least two lasers, optical means (e.g. an optical device configured to take fluorescence images) and means adapted to execute the digital steps or all the steps of a method according to the first aspect of the disclosure.

In some embodiments, the device or system further comprises the target or monitored target.

A fourth aspect of the disclosure relates to a device or system comprising: at least one processor, and at least one memory comprising computer program code for one or more programs; the at least one processor, the at least one memory, and the computer program code configured to cause the device or system to at least carry out the digital steps of a method according to the first aspect of the disclosure.

A fifth aspect of the disclosure relates to a computer program product comprising instructions which, when the program is executed by a computer, cause the computer to carry out the digital steps or all the steps of a method according to the first aspect of the disclosure.

A sixth aspect of the disclosure relates to a non-transitory computer-readable medium encoded with instructions that, when executed by at least one processor or hardware, perform or make a device to perform the digital steps or all the steps of a method according to the first aspect of the disclosure.

A seventh aspect of the disclosure relates to a computer-readable data carrier having stored thereon a computer program product according to the fifth aspect of the disclosure.

An eighth aspect of the disclosure relates to a data carrier signal carrying a computer program product according to the fifth aspect of the disclosure.

Similar advantages as those described with respect to the first aspect disclosure also apply to the remaining aspects of the disclosure.

BRIEF DESCRIPTION OF THE DRAWINGS

To complete the description and in order to provide for a better understanding of the disclosure, a set of drawings is provided. Said drawings form an integral part of the description and illustrate embodiments, which should not be interpreted as restricting the scope of the disclosure, but just as examples of how the disclosed methods or entities can be carried out. The drawings comprise the following figures.

DETAILED DESCRIPTION OF THE DRAWINGS

Figure 1:
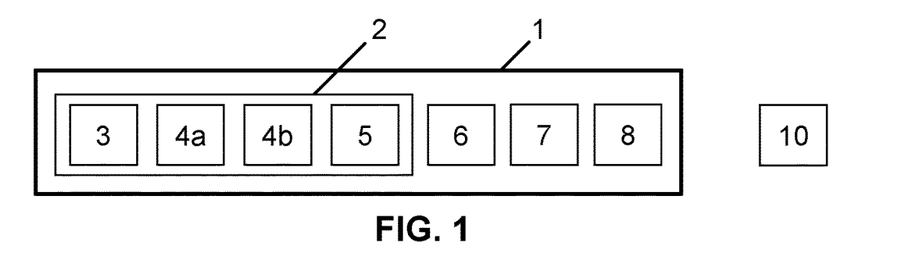
FIGS. 1 and 2 diagrammatically shows processing devices or systems in accordance with embodiments.

FIG. 1 diagrammatically shows a processing device or system 1 in accordance with embodiments.

The processing device or system 1 provides a quantum classifier for classification of data related to a target 10 to be monitored and, optionally, solving of computational problems related to the target 10 (indicative of e.g. the status of the target 10, detection of problems in the target 10 or measurements thereof, etc.). Methods according to the present disclosure can be carried out by the processing device or system 1.

The processing device or system 1 comprises a quantum circuit 2 in turn comprising a vacuum chamber 3, at least two lasers 4a, 4b (but further lasers can be arranged), and optical means 5 for reading a quantum register formed in the vacuum chamber 3.

The vacuum chamber 3 is filled with neutral atoms, such as, but without limitation, rubidium atoms. At least a first laser 4a (but further lasers can be used as well when there are more than two lasers) traps atoms in optical tweezers inside the vacuum chamber 3; to this end, the at least first laser 4a preferably radiates the ensemble of atoms within the vacuum chamber 3 with a spot having a diameter equal to or less than 2 micrometers. The at least second laser 4b radiates the ensemble of atoms to excite at least some of them to provide or use the classifier in accordance with laser parameters obtainable from laser controlling function. The array of the optical tweezers provides the quantum register that can be processed with the optical means 5.

The processing device or system 1 further comprises at least one processor 6, e.g. at least one classical processor, and at least one memory 7 for storage of instructions, for example in the form of a computer program code, so that a method according to the present disclosure is carried out upon execution by the at least one processor 6; the at least one memory 7 may also store data related to the quantum classifier itself. Preferably, the at least one processor 6 comprises two or more processors, one for controlling the at least one laser 4, and another one for the computations necessary to provide the quantum classifier.

The processing device or system 1 also comprises a communications module 8 at least so that it can be communicatively coupled with the quantum circuit 2, and preferably with a target 10 as well, e.g. apparatuses, systems or controlling devices operating the same or a process. Notwithstanding, values about different features of the target 10 can be provided to the processing device or system 1 with a data storage medium, and likewise any possible command or instruction to be provided to the target 10 can be provided with a data storage medium or manually introduced by an operator, for example but without limitation, when the target does not have a communications module. The communications module 8 can be any known in the art for wired or wireless data communications. In some embodiments, the processing device or system 1 also comprises the target 10.

Figure 2:
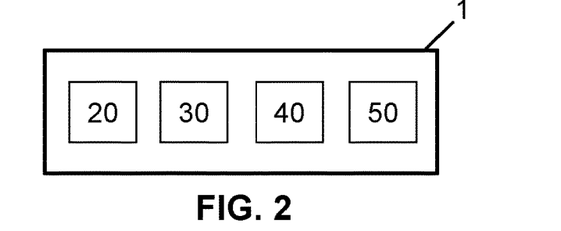

FIG. 2 diagrammatically shows a processing device or system 1, in terms of functional modules, in accordance with embodiments.

A first module 20 is an initialization module intended to prepare the quantum circuit of the processing device or system 1 with a quantum register, with at least a first laser, whenever a quantum classifier is to be configured therein.

A second module 30 is a quantum classifier configuration module intended to configure the quantum circuit initiated by the first module 20 such that at least a second laser excites atoms of the quantum register.

A third module 40 is a quantum classifier setting module intended to assess a precision of the quantum classifier configured by the second module 30, or a convergence attained between different quantum classifiers configured by the second module 30. The third module 40 is likewise intended to decide whether the quantum classifier has sufficient precision and, hence, the quantum classifier is set or, alternatively, a different quantum classifier has to be set.

A fourth module 50 is a quantum classifier converging module intended to change parameters that are to force reconfiguration of the quantum classifier by the second module 30.

These modules 20, 30, 40, and 50 will be described in more detail below with reference to FIG. 3.

Figure 3:
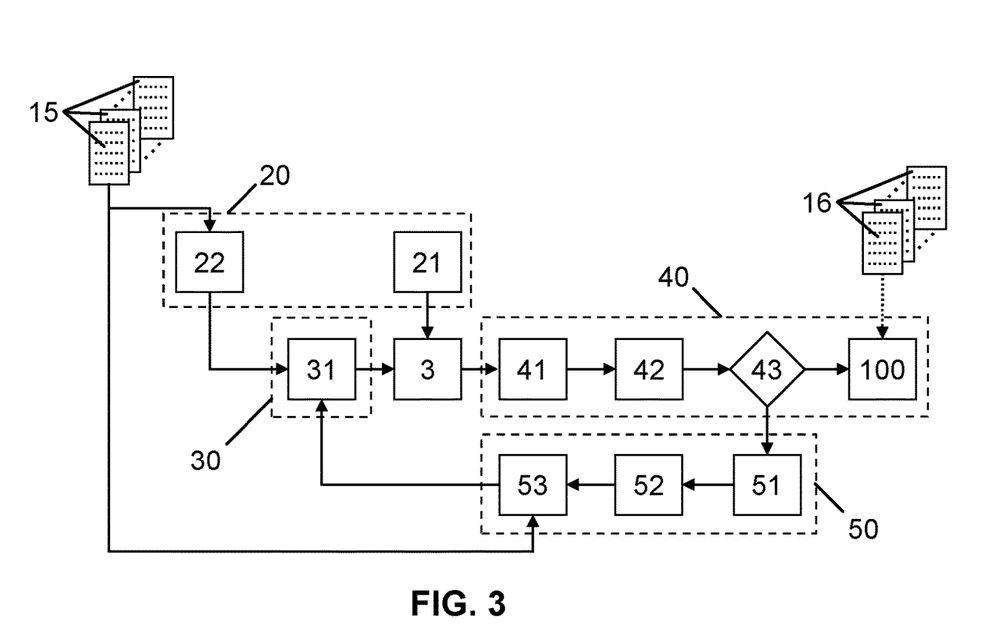
FIG. 3 diagrammatically shows operation of processing devices or systems in accordance with embodiments, thereby illustrating methods in accordance with embodiments.

FIG. 3 diagrammatically shows operation of processing devices or systems in accordance with embodiments, thereby illustrating methods in accordance with embodiments.

A processing device or system (such as the processing device or system 1 described with reference to FIG. 1 and/or FIG. 2) comprises the first, second, third and fourth modules 20, 30, 40 and 50. Blocks within the modules illustrate, for the sake of clarity only, different tasks run by each module.

The first module 20 operates, with at least one processor, a laser for radiation 21 of a vacuum chamber 3 comprising atomic vapor with the laser so as to provide a quantum register by trapping atoms of an ensemble of neutral atoms in optical tweezers.

The first module 20 also configures 22, with at least one processor, a laser controlling function and reduces a cost function for classifier problems in accordance with the laser controlling function. The cost function counts an error in the classification of vector(s) about a target (e.g. the target 10 described with reference to FIG. 1), each with a value for each of N features thereof. The reduction changes the sets of weight values and the sets of free parameters (since both are variational parameters of the quantum classifier) of unitary operations of the laser controlling function, and to that end the at least one processor processes a training dataset 15 with a plurality of vectors each with the historical value about the N features of the target to be monitored.

The laser controlling function includes a plurality of unitary operations, and each unitary operation at least depends upon: a) the N historical values of each vector of the plurality of vectors, b) the set of weight values to be changed for reduction of the cost function, and c) the set of free parameters to be changed for reduction of the cost function.

The second module 30 receives laser parameters resulting from the different unitary operations of the laser controlling function as configured 22 by the first module 20 or, alternatively, as reconfigured 53 by the fourth module 50 as will be explained later. It is also envisioned that, in some embodiments, the second module 30 receives the configured 22 or reconfigured 53 laser controlling function and retrieves the laser parameters therefrom. The second module 30 operates, with at least one processor, the at least second laser according to the laser parameters of the received laser controlling function for radiating 31 the ensemble of atoms in the vacuum chamber 3.

The third module 30 reads 41, with optical means, the quantum register in the vacuum chamber 3, and defines, with at least one processor, a bit for each optical tweezer in the quantum register with a binary value thereof based on an amount of light produced by the respective atom.

The third module 30 also computes 42, with at least one processor, a result of the same cost function of the configuration 22 of the first module 20 but using the bits defined following the reading 41 of the quantum register.

The third module 40 further processes, with at least one processor, the computed 42 result of the cost function and determines 43 whether the classifier can be set or not. Particularly, when the result is below a predetermined threshold, the classifier for the target is set 100 with the values of both the sets of weight values and the sets of free parameters; otherwise, the fourth module 50 attempts to attain the setting of a better quantum register. Further, the determination 43 with at least one processor also processes the result of the computed 42 result of the cost function and of previous computed 42 results to cost functions, if there are any, to derive a convergence factor. When the convergence factor fulfills a predetermined criterion, the classifier for the target is set 100, and if not then the fourth module 50 further attempts to attain the setting of a better quantum register.

When the classifier is set 100, the classifier can be tested or benchmarked, with at least one processor, by receiving and processing a benchmarking dataset 16 with a plurality of vectors, each with a historical value about one of the N features of the target. Additionally or alternatively, data about the target can be provided to the classifier set 100 for classification thereof, or a computational problem related to the target can be provided to the classifier set 100 for solving thereof.

The fourth module 50 stores 51, in at least one memory with at least one processor, the result of the cost function as computed 42 by the third module 40 and, optionally, the sets of weight values and free parameters as provided by the first module 20 during the reduction of the cost function or, in other words, those yielding the laser parameters used in the last irradiation 31 of the ensemble of atoms by the second module 30.

The fourth module 50 modifies 52, with at least one processor, the variational parameters, namely the sets of weight values and sets of free parameters. The modification is conducted with an optimization technique such as gradient descent.

Then, the fourth module 50 takes the modified 52 sets of weight values and sets of free parameters and reconfigures 53, with at least one processor, the laser controlling function by processing the training dataset 15, and reduces the cost function with the modified 52 sets of weight values and sets of free parameters. This, in turn, yields modified laser parameters for each unitary operation.

The laser parameters resulting from the reconfigured laser controlling function are provided to the second module 30, which again operates the laser according to the modified laser parameters to radiate 31 the ensemble of atoms so as to provide a different classifier by way of differently excited atoms in the quantum register in the vacuum chamber 3. Then, the third module 40 processes the quantum register by reading 41 it, computes 42 the new result of the cost function, and determines 43 whether a quantum classifier can be set 100 or, alternatively, the fourth module 50 has to further reconfigure 53 the laser controlling function to provide a better quantum classifier, that is to say, one that attains a convergence factor with respect to previous quantum classifiers that fulfills the predetermined criterion.

Figure 4:
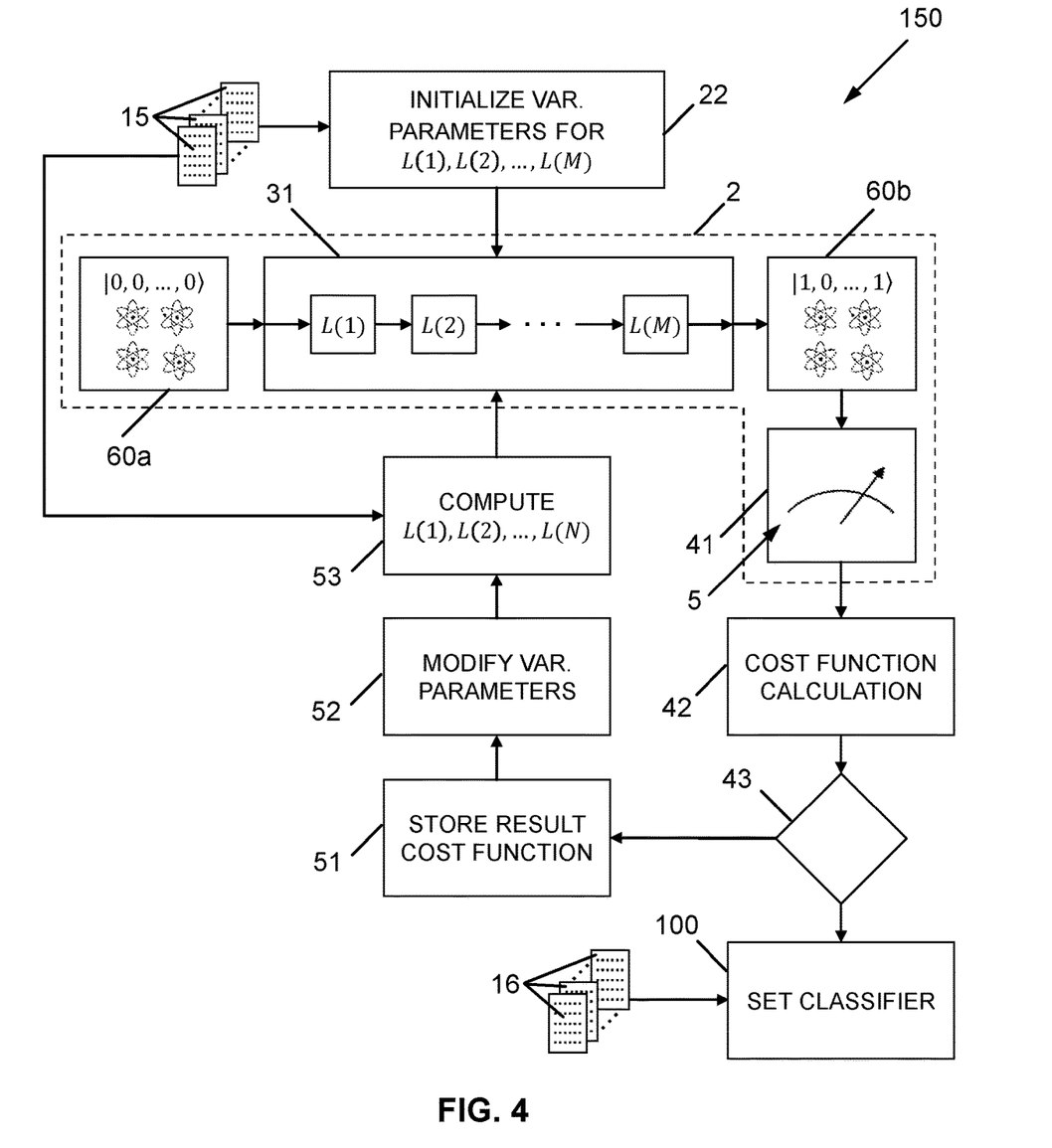
FIG. 4 diagrammatically shows a method in accordance with embodiments.

FIG. 4 diagrammatically shows a method 150 in accordance with embodiments.

In the method 100, a laser controlling function in the form of a plurality of unitary operations L is set and configured 22 for classifying problems related to a target. In this sense, among all unitary operations, the N features of the target are coded. The laser controlling function is configured 22 in accordance with the training dataset 15 provided with the plurality of vectors about the target, each having historical values of the N features. The variational parameters necessary for each unitary operation of the laser controlling function are initialized by way of the training dataset 15 and a cost function for classification of the N historical values of the vector(s).

In the method 100, and in the quantum circuit 2, the laser controlling function yields laser parameters that are configured in the laser that, in turn, radiates 31 the ensemble of atoms such that the different unitary operations are sequentially applied. The ensemble of atoms have been previously trapped in optical tweezers by another laser as part of method 100, thereby providing a quantum register 60a. The atoms in the quantum register 60a are in neutral state such that they all are |0>. The irradiation 31 excites at least some atoms according to a Rydberg state owing to the laser parameters obtained, and the quantum register 60b reflects the excitation of the atoms. Excited atoms, i.e. |1>, and non-excited atoms, i.e. |0>, are identified upon reading 41 the quantum register 60b with optical means 5.

The readout 41 of the quantum register 60b is followed by a digitization of the identified atoms, and then a result of the cost function is calculated 42 with the digitized atoms.

Depending on the result calculated 42, it is determined 43 whether the quantum classifier can be set 100, in which case the variational parameters, namely the weight values and free parameters, are stored, or whether the classifier must be further improved before being set 100. In the latter case, the result of the cost function is stored 51 (in some embodiments, the variational parameters are stored alongside the result), the variational parameters are modified 52 with an optimization technique, e.g. gradient descent, and the laser controlling function is reconfigured 53 with the modified 52 variational parameters and the training dataset 15 aiming to reduce the cost function.

The reconfigured laser controlling function yields different laser parameters that are configured in the laser that radiates 31 the ensemble of atoms whilst the quantum register 60a has the atoms in neutral state, i.e. |0>, and the same procedure is repeated until some convergence is attained for determining 43 that the quantum classifier can be set 100 and its variational parameters stored for later use of the classifier.

The quantum classifier set 100 can be tested with the benchmarking dataset 16 and, based on the result, the method 150 may be started all over again if the result of the quantum classifier is determined not to be good because it exceeds a predetermined threshold, or because it does not exceed the predetermined threshold, depending on how the threshold is set.

In this text, the term "comprises" and its derivations—such as "comprising", etc.— should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art—for example, as regards the choice of materials, dimensions, components, configuration, etc.—, within the general scope of the disclosure as defined in the claims.

The invention claimed is:

1. A method for quantum classification and operation control, the method including the following steps:

radiating a vacuum chamber comprising an ensemble of neutral atoms with laser configured to trap atoms of the ensemble of neutral atoms in an array of optical tweezers, thereby providing a quantum register, and each optical tweezer comprising a single neutral atom;

digitally configuring, by processing a training dataset with a plurality of vectors about a target where each vector has a historical value for each of N features of the target, a laser controlling function, and digitally reducing, based on the laser controlling function, a cost function counting an error in the classification of one or more vectors about the target where each vector has a value for each of N features of the target, wherein:

the laser controlling function includes M unitary operations, M being a natural number greater than 1 and less than or equal to N, with each unitary operation being at least dependent upon: a) the N historical values of each vector of the plurality of vectors of the training dataset, b) a set of weight values for a) and comprising a predetermined set of weight values, and c) a set of free parameters comprising a predetermined set of free parameters, and the cost function being reduced by changing the set of weight values of b) and the set of free parameters of c) of each unitary operation;

radiating the ensemble of atoms with laser configured to excite at least some atoms of the quantum register, with the laser being operated in accordance with laser parameters resulting from each unitary operation of the configured laser controlling function;

reading the quantum register with optical means, and digitally defining a bit for each atom in the quantum register with a binary value thereof based on an amount of light produced by the respective atom;

using the bits defined, digitally computing a result of the cost function counting the error in the classification of one or more vectors about the target where each vector has a value for each of N features of the target; and digitally processing a computed result of the cost function such that: when the result is below a predetermined threshold, digitally setting a classifier for the target, the classifier being set with the values of both the sets of weight values of b) and the sets of free parameters of c) of the configured laser controlling function; and when the result is not below the predetermined threshold, carrying out the following in a looped manner until a convergence factor fulfills a predetermined criterion:

digitally storing at least the result of the cost function as last computed;

digitally modifying at least one of the sets of weight values of b) and the set of free parameters of c) of each unitary operation with an optimization technique;

digitally reconfiguring the laser controlling function by processing the training dataset, and digitally reducing, based on the reconfigured laser controlling function, the cost function with the modified at least one of the sets of weight values of b) and the set of free parameters of c) of each unitary operation;

radiating the ensemble of atoms with laser configured to excite at least some atoms of the quantum register, with the laser being operated in accordance with laser parameters resulting from each unitary operation of the laser controlling function as last reconfigured;

reading the quantum register with optical means after the last irradiation of the ensemble of atoms, and digitally defining the bits based on the quantum register as last read;

using the bits as last defined, digitally computing a result of the cost function;

digitally processing the result of the cost function as last computed, and digitally providing a convergence factor based on both said result and the result as last stored; and if the convergence factor fulfills the predetermined criterion, digitally setting the classifier for the target, the classifier being set with the values of both the sets of weight values of b) and the sets of free parameters of c) of the laser controlling function as last reconfigured.

2. The method of claim 1, wherein the target is an operation of an apparatus or a system, or a behavior of a process.

3. The method of claim 1, further including the following steps:
reconfiguring the laser controlling function by processing a computational problem in the form of a function for classification problems that is at least defined by one or more vectors, with each vector having a value for each of N features of the target, and making each unitary operation to at least depend upon: a) the N values of each vector of the one or more vectors, b) the set of weight values of the classifier digitally set, and c) the sets of free parameters of the classifier digitally set;
radiating the ensemble of atoms with laser configured to excite at least some atoms of the quantum register, with the laser being operated in accordance with laser parameters resulting from each unitary operation of the reconfigured laser controlling function;
reading the quantum register with optical means after the last irradiation of the ensemble of atoms, and digitally defining the bits based on the quantum register as last read; and
digitally solving the computational problem using the bits as last defined.

4. The method of claim 3, wherein the target is an operation of an apparatus or a system, or a behavior of a process; and wherein the method further includes the step of digitally determining at least one of the following based on a solution to the computational problem:
existence of a predetermined event or condition in the target;
whether a potential anomaly exists in the target; and
a configuration of the apparatus or the system intended to at least one of improve the operation and solve the potential anomaly thereof, or a configuration of any apparatus or system in the process intended to at least one of improve the behavior and solve the potential anomaly thereof.

5. The method of claim 4, wherein the digitally determining step at least comprises digitally determining the configuration; and wherein the method further includes digitally providing the configuration and digitally providing at least one command to reconfigure to the apparatus, the system, or the apparatus or the system intervening in the process.

6. The method of claim 3, wherein the computational problem relates to one of: detection of a potential illness in medical measurements, decision-making of a central unit of an autonomous vehicle, control of an electric device or machine, control of a production line, control of a factory, detection of at least one of fraudulent bank and credit card transactions, and credit-scoring for insurance and loans.

7. The method of claim 1, wherein the laser controlling function has the following formula: $\mathcal{U} = L(M)L(M-1) \ldots L(1)$, where L are the unitary operations; each unitary operation L has the following formula: $L(i) = U(\vec{\theta}_i^k + \vec{\omega}_i^k \circ \vec{x}^k) \ldots U(\vec{\theta}_i^1 + \vec{\omega}_i^1 \circ \vec{x}^1)$, where: $\vec{\theta}_i^k$ is a three-dimensional vector of k-th components of the set of free parameters of c); $\vec{\omega}_i^k$ is a three-dimensional vector of k-th components of the set of weight values of b); $\vec{x}^k$ is a three-dimensional vector of k-th components of one or more vectors dataset about the target, with the index j of the point in the dataset being swept from 1 to a length of the dataset so that all points are evaluated; $\circ$ is a component-wise vector product; U is the unitary operator; i is an index of the unitary operation; and k is an index of parameters, with k=1 ... ceil(N/3).

8. The method of claim 1, wherein the laser controlling function is a time-dependent Hamiltonian in the form of the M unitary operations, the time dependent Hamiltonian having the following formula:

$$H(t) = \hbar\Omega(t)\sum_j \sigma_j^x - \hbar\Delta(t)\sum_j n_j + \sum_{ij} \frac{C_6}{r_{ij}^6} n_i n_j;$$

where: h is Planck's constant divided by 2π; Ω is a Rabi frequency of the laser radiating the ensemble of atoms; Δ, which is greater than or equal to zero, is a detuning between the laser radiating the ensemble of atoms and atomic frequencies of the atoms in the vacuum chamber; $C_6$ is an interaction strength of Van der Waals long-range interactions between atoms; $r_{ij}$ is a physical distance between atoms i and j; $\sigma^x = |0\rangle\langle1| + |1\rangle\langle0|$; $n = |1\rangle\langle1|$; and $|0\rangle$ and $|1\rangle$ are respective electronic levels for quantum states of an atom and respectively correspond to an atomic ground state and a Rydberg state.

9. The method of claim 1, wherein the cost function has the following formula:

$$C = \sum_j (y_j - F(\vec{x}_j))^2;$$

where: $F(\vec{x}_j)$ is an outcome of the classification of vector $\vec{x}_j$; and $y_j$ is a correct classification of the vector $\vec{x}_j$.

10. The method of claim 1, wherein the laser parameters include a Rabi frequency of the laser radiating the ensemble of atoms, a detuning between the laser radiating the ensemble of atoms and atomic frequencies of the atoms, and a gate time T of the laser radiating the ensemble of atoms.

11. The method of claim 10, wherein in each radiating the ensemble of atoms with laser step, the Rabi frequency and the detuning are kept constant.

12. A system comprising:
a vacuum chamber;
at least two lasers;
an optical device;
at least one processor; and
at least one memory comprising computer program code for one or more programs;
wherein the at least one processor, the at least one memory, and the computer program code are configured to cause the system to at least:
radiate the vacuum chamber comprising an ensemble of neutral atoms with laser configured to trap atoms of the ensemble of neutral atoms in an array of optical tweezers, thereby providing a quantum register, and each optical tweezer comprising a single neutral atom;
digitally configure, by processing a training dataset with a plurality of vectors about a target where each vector has a historical value for each of N features of the target, a laser controlling, and digitally reduce, based on the laser controlling function, a cost function counting an error in the classification of one or more vectors about the target where each vector has a value for each of N features of the target, wherein:
the laser controlling function includes M unitary operations, M being a natural number greater than 1 and less than or equal to N, with each unitary operation being at least dependent upon: a) the N historical values of each vector of the plurality of vectors of the training dataset, b) a set of weight values for a) and comprising a predetermined set of weight values, and c) a set of free parameters comprising a predetermined set of free parameters, and the cost function being reduced by changing the set of weight values of b) and the set of free parameters of c) of each unitary operation;

radiate the ensemble of atoms with laser configured to excite at least some atoms of the quantum register, with the laser being operated in accordance with laser parameters resulting from each unitary operation of the configured laser controlling function;

read the quantum register with optical means, and digitally define a bit for each atom in the quantum register with a binary value thereof based on an amount of light produced by the respective atom;

using the bits defined, digitally compute a result of the cost function counting the error in the classification of one or more vectors about the target where each vector has a value for each of N features of the target; and digitally process a computed result of the cost function such that: when the result is below a predetermined threshold, digitally set a classifier for the target, the classifier being set with the values of both the sets of weight values of b) and the sets of free parameters of c) of the configured laser controlling function; and when the result is not below the predetermined threshold, carry out the following in a looped manner until a convergence factor fulfills a predetermined criterion:

digitally store at least the result of the cost function as last computed;

digitally modify at least one of the sets of weight values of b) and the set of free parameters of c) of each unitary operation with an optimization technique;

digitally reconfigure the laser controlling function by processing the training dataset, and digitally reduce, based on the reconfigured laser controlling function, the cost function with the modified at least one of the sets of weight values of b) and the set of free parameters of c) of each unitary operation;

radiate the ensemble of atoms with laser configured to excite at least some atoms of the quantum register, with the laser being operated in accordance with laser parameters resulting from each unitary operation of the laser controlling function as last reconfigured;

read the quantum register with optical means after the last irradiation of the ensemble of atoms, and digitally define the bits based on the quantum register as last read;

using the bits as last defined, digitally compute a result of the cost function;

digitally process the result of the cost function as last computed, and digitally provide a convergence factor based on both said result and the result as last stored; and if the convergence factor fulfills the predetermined criterion, digitally set the classifier for the target, the classifier being set with the values of both the sets of weight values of b) and the sets of free parameters of c) of the laser controlling function as last reconfigured.

13. The system of claim 12, wherein the target is an operation of an apparatus or a system, or a behavior of a process.

14. The system of claim 12, wherein the at least one processor, the at least one memory, and the computer program code are configured to further cause the system to at least:

reconfigure the laser controlling function by processing a computational problem in the form of a function for classification problems that is at least defined by one or more vectors, with each vector having a value for each of N features of the target, and making each unitary operation to at least depend upon: a) the N values of each vector of the one or more vectors, b) the set of weight values of the classifier digitally set, and c) the sets of free parameters of the classifier digitally set;

radiate the ensemble of atoms with laser configured to excite at least some atoms of the quantum register, with the laser being operated in accordance with laser parameters resulting from each unitary operation of the reconfigured laser controlling function;

read the quantum register with optical means after the last irradiation of the ensemble of atoms, and digitally define the bits based on the quantum register as last read; and digitally solve the computational problem using the bits as last defined.

15. The system of claim 14, wherein the target is an operation of an apparatus or a system, or a behavior of a process; and wherein the at least one processor, the at least one memory, and the computer program code are configured to further cause the system to at least digitally determine at least one of the following based on a solution to the computational problem:

existence of a predetermined event or condition in the target;

whether a potential anomaly exists in the target; and a configuration of the apparatus or the system intended to at least one of improve the operation and solve the potential anomaly thereof, or a configuration of any apparatus or system in the process intended to at least one of improve the behavior and solve the potential anomaly thereof.

16. The system of claim 14, wherein the computational problem relates to one of: detection of a potential illness in medical measurements, decision-making of a central unit of an autonomous vehicle, control of an electric device or machine, control of a production line, control of a factory, detection of at least one of fraudulent bank and credit card transactions, and credit-scoring for insurance and loans.

17. The system of claim 12, wherein the laser controlling function has the following formula: $\mathcal{U}=L(M)L(M-1)\ldots L(1)$, where L are the unitary operations; each unitary operation L has the following formula: $L(i)=U(\vec{\theta}_i^k+\vec{\omega}_i^k \circ \vec{x}^k)\ldots U(\vec{\theta}_i^1+\vec{\omega}_i^1 \circ \vec{x}^1)$, where: $\vec{\theta}_i^k$ is a three-dimensional vector of k-th components of the set of free parameters of c); $\vec{\omega}_i^k$ is a three-dimensional vector of k-th components of the set of weight values of b); $\vec{x}^k$ is a three-dimensional vector of k-th components of one or more vectors dataset about the target, with the index j of the point in the dataset being swept from 1 to a length of the dataset so that all points are evaluated; $\circ$ is a component-wise vector product; U is the unitary operator; i is an index of the unitary operation; and k is an index of parameters, with k=1 ... ceil(N/3).

18. The system of claim 12, wherein the laser controlling function is a time-dependent Hamiltonian in the form of the M unitary operations, the time dependent Hamiltonian having the following formula:

$$H(t) = h\Omega(t)\sum_j \sigma_j^x - h\Delta(t)\sum_j n_j + \sum_{ij} \frac{C}{r_{ij}^6} n_i n_j;$$

where: h is Planck's constant divided by 2π; Ω is a Rabi frequency of the laser radiating the ensemble of atoms; Δ, which is greater than or equal to zero, is a detuning between the laser radiating the ensemble of atoms and atomic frequencies of the atoms in the vacuum chamber; $C_6$ is an interaction strength of Van der Waals long-range interactions between atoms; $r_{ij}$ is a physical distance between atoms i and j; $\sigma^x=|0\rangle\langle 1|+|1\rangle\langle 0|$; $n=|1\rangle\langle 1|$; and $|0\rangle$ and $|1\rangle$ are respective electronic levels for quantum states of an atom and respectively correspond to an atomic ground state and a Rydberg state.

19. The system of claim 12, further comprising the target.

20. A non-transitory computer-readable medium encoded with instructions that, when executed by at least one processor or hardware, perform or make a device or system to at least perform the following:
  digitally configure, by processing a training dataset with a plurality of vectors about a target where each vector has a historical value for each of N features of the target, a laser controlling function, and digitally reduce, based on the laser controlling function, a cost function counting an error in the classification of one or more vectors about the target where each vector has a value for each of N features of the target, wherein:
    the laser controlling function includes M unitary operations, M being a natural number greater than 1 and less than or equal to N, with each unitary operation being at least dependent upon: a) the N historical values of each vector of the plurality of vectors of the training dataset, b) a set of weight values for a) and comprising a predetermined set of weight values, and c) a set of free parameters comprising a predetermined set of free parameters, and the cost function being reduced by changing the set of weight values of b) and the set of free parameters of c) of each unitary operation;
  operate a laser in accordance with laser parameters resulting from each unitary operation of the configured laser controlling function to radiate an ensemble of atoms in a vacuum chamber configured to excite at least some atoms of a quantum register provided by an array of optical tweezers;
  digitally define a bit for each atom in the quantum register with a binary value thereof based on an amount of light produced by the respective atom;
  using the bits defined, digitally compute a result of the cost function counting the error in the classification of one or more vectors about the target where each vector has a value for each of N features of the target; and
  digitally process a computed result of the cost function such that: when the result is below a predetermined threshold, digitally set a classifier for the target, the classifier being set with the values of both the sets of weight values of b) and the sets of free parameters of c) of the configured laser controlling function; and when the result is not below the predetermined threshold, carrying out the following in a looped manner until a convergence factor fulfills a predetermined criterion:
    digitally store at least the result of the cost function as last computed;
    digitally modify at least one of the sets of weight values of b) and the set of free parameters of c) of each unitary operation with an optimization technique;
    digitally reconfigure the laser controlling function by processing the training dataset, and digitally reducing, based on the reconfigured laser controlling function, the cost function with the modified at least one of the sets of weight values of b) and the set of free parameters of c) of each unitary operation;
    operate the laser in accordance with laser parameters resulting from each unitary operation of the laser controlling function as last reconfigured to radiate the ensemble of atoms in the vacuum chamber configured to excite at least some atoms of the quantum register;
    digitally define the bits based on the quantum register after the last radiation with the laser;
    using the bits as last defined, digitally compute a result of the cost function;
    digitally process the result of the cost function as last computed, and digitally provide a convergence factor based on both said result and the result as last stored; and
    if the convergence factor fulfills the predetermined criterion, digitally set the classifier for the target, the classifier being set with the values of both the sets of weight values of b) and the sets of free parameters of c) of the laser controlling function as last reconfigured.

* * * * *